United States Patent [19]
Shields

[11] Patent Number: 5,695,543
[45] Date of Patent: Dec. 9, 1997

[54] METHOD FOR METAL REDUCTION OF STEEL WASTE PRODUCTS

[75] Inventor: Desmond L. Shields, Draper, Utah

[73] Assignee: D & S Technologies, Inc., Draper, Utah

[21] Appl. No.: 644,217

[22] Filed: May 10, 1996

[51] Int. Cl.⁶ .................................................. C21B 11/10
[52] U.S. Cl. ........................... 75/10.63; 75/500; 75/504; 75/961; 75/962
[58] Field of Search ........................ 75/96.1, 96.2, 75/10.63, 500, 504

[56] References Cited

U.S. PATENT DOCUMENTS

| | | | |
|---|---|---|---|
| 3,793,468 | 2/1974 | Akers | 13/9 |
| 3,912,501 | 10/1975 | De Castejon | 75/11 |
| 3,963,483 | 6/1976 | Mathesius et al. | 75/11 |
| 4,133,967 | 1/1979 | Nafziger et al. | 13/9 |
| 4,495,625 | 1/1985 | Heberlein et al. | 373/107 |
| 4,509,177 | 4/1985 | Fey | 373/60 |
| 4,530,101 | 7/1985 | Fey et al. | 373/19 |
| 5,338,336 | 8/1994 | Greenwalt | 75/445 |
| 5,368,627 | 11/1994 | Cowx | 75/10.19 |
| 5,397,379 | 3/1995 | Barker et al. | 75/303 |
| 5,470,375 | 11/1995 | Greenwalt | 75/505 |
| 5,471,495 | 11/1995 | Berger et al. | 373/2 |
| 5,531,805 | 7/1996 | Worner | 75/961 |

*Primary Examiner*—Melvyn Andrews
*Attorney, Agent, or Firm*—Lloyd W. Sadler; Daniel P. McCarthy

[57] ABSTRACT

A method and system for recovering metal from steel waste products is disclosed. This method and system works on such hazardous and/or toxic wastes as mill scale, flue dust and slag. This method and system operates by mixing the steel waste produce with a flux composition and then melting the mix in a single phase two electrode electric arc furnace. Once the mixture is melted by the heat from the electrodes, the electro-magnetic field induced in the melted mixture serves to enhance the recovery from the steel waste product of useful steel material. Furthermore, this method and system provide a cost effective solution to the hazardous waste disposal problems impacting steel refineries around the world and does so in a manner that removes the toxicity of the waste while producing a variety of useful products, including high grade steel and neutralized fill.

8 Claims, 4 Drawing Sheets

METHOD FOR METAL REDUCTION OF STEEL WASTE PRODUCTS

BACKGROUND OF THE INVENTION

1. Field of the Invention

This invention relates to the reduction and clean up of hazardous waste resulting from steel and steel product production and of the recycling of steel waste products. More specifically, this invention is a method and system which produces steel by mixing and melting mill scale, flue dust and a special flux in a specifically designed electric arc furnace. Furthermore, this invention permits the recycling and recovery of steel from slag and other steel waste products.

2. Description of Related Art

While steel production is an ancient art and a variety of approaches are used to process different waste products resulting from steel production, this invention is the first known to the applicant to solve the problem of metal reduction recycling of each of the most problematic steel production waste produces; namely, mill scale, flue dust and slag.

For general background are the reader is directed to U.S. Pat. Nos. 5,471,495, 5,470,375, 5,338,336, 4,530,101, 4,509,177, 4,495,625, 4,133,967, 3,963,483, 3,912,501, and 3,793,468, each of which is hereby incorporated by reference in its entirety for the material disclosed therein.

U.S. Pat. No. 5,471,495 discloses an electric arc furnace for the production of steel by melting scrap, in particular iron scrap, and/or sponge iron and/or pig iron as well as fluxes in a furnace vessel, into which at least one graphite electrode projects, which is displaceable in its longitudinal direction, and where an electric arc is ignited between the graphite electrode and the charging stock.

U.S. Pat. Nos. 5,470,375 and 5,338,336 disclose a method for processing environmentally undesirable materials including petroleum coke and the sulfur and heavy metals contained therein and agglomerated waste dust from an electric arc furnace and the zinc, cadmium, lead and iron oxides contained therein and of providing fuel and a charging material for a process of making molten iron or steel preproducts and reduction gas in a melter gasifier.

U.S. Pat. No. 4,530,101 discloses an electric arc fired furnace or cupola for providing an arc-heated air stream to melt loose metal chips and larger pieces of metal scrap.

U.S. Pat. No. 4,509,177 discloses an electric-arc fired blast furnace system for the reduction of iron-bearing material utilizing electric-arc heated air containing a reducing gas or carbon-containing fuel allowing for a decrease in the amount of coke normally used in the reduction process.

U.S. Pat. No. 4,495,625 discloses a DC electric arc furnace utilizing a magnetic field stabilized electric arc.

U.S. Pat. No. 4,133,967 discloses a two-stage electric arc furnace for a continuous steelmaking process.

U.S. Pat. No. 3,963,483 discloses a method for a direct reduction steelmaking process utilizing an electric arc furnace.

U.S. Pat. No. 3,912,501 discloses a process for the production of iron and steel using a direct arc electric furnace.

U.S. Pat. No. 3,793,468 discloses an electric arc furnace which produces a magnetic field which improves the operation of the furnace.

None of these prior related art references discloses a method or system capable of reducing metal from a composition of mill scale, flue dust and slag, while simultaneously removing the hazardous waste products resulting from steel production processes.

OBJECTS OF THE INVENTION

It is an object of this invention to provide a method for reducing and recycling hazardous waste products from the steel industry.

It is a further object of this invention to provide a method for reclaiming steel from steel process waste products, specifically mill scale, flue dust and slag.

It is a further object of this invention to provide a process whereby toxic hazardous waste products from steel production can be de-toxified and converted to a benign and useful material.

It is a further object of this invention to provide a system for reducing steel plant waste materials and recovering significant quantities of useful steel and to do so in a cost effective manner.

Additional objects, features and advantages of this invention will become apparent to persons of ordinary skill in the art upon reading the remainder of the specification and upon referring to the attached Figures.

SUMMARY OF THE INVENTION

These objects are performed by mixing mill scale, flue dust, coke and a specific flux composition together; pelletizing the mixture; drying the pelletized mixture; and melting the mixture in a specific electric arc furnace. A layer of coke is provided as a top surface cover of the melting mixture. When brought to a completely liquid state, the mixture is poured in to steel molds and the slag, which floats to the top of the molds, is broken off. The slag may then be crushed and introduced into the next mixing cycle to recover the metals resident in the slag composition.

A critical part of this invention is the composition of the flux. While the precise proportions of the flux will depend on testing and analysis of the source waste material, a typical and functional composition of the flux is 15% silica, 25% soda ash, 25% borax, 5% fluorspar, and 25% coke (or alternatively resin coal). Furthermore, it is key to this process that the mill scale be mixed to the flue dust in approximately a three-to-one ratio.

Another essential part of this invention is the use of a special electric arc furnace. The key to the furnace design is the use of two carbon rod electrodes, one with a positive charge and the other with a negative charge. These electrodes are by a single phase electric arc transformer. After the above described mixture is placed within the furnace crucible, the electrodes are lowered into the mixture. When voltage is applied to the electrodes heat as well as high electro-magnetic fields are induced within the mixture. As the mixture is melted, the high electro-magnetic fields cause the steel in the mill scale to separate from the composition and to be recoverable. Once the mixture is fully liquified, it is poured from the crucible into steel bar molds, at which time the steel settles on the bottom and a slag forms on the top surface. This slag can then be broken off, ground up and reintroduced into the mixture and can constitute up to 25% of the total of flux. The steel that remains in the molds has been fully recovered and can be further processed into any number of steel products.

Typically this invention operates in its best mode when the total mixture is approximately 50% flux, 37.5% mill scale and 12.5% flue dust. Such a combination typically yields between 75% to 85% recovery from the mill scale.

DETAILED DESCRIPTION OF THE INVENTION

Figure 1:
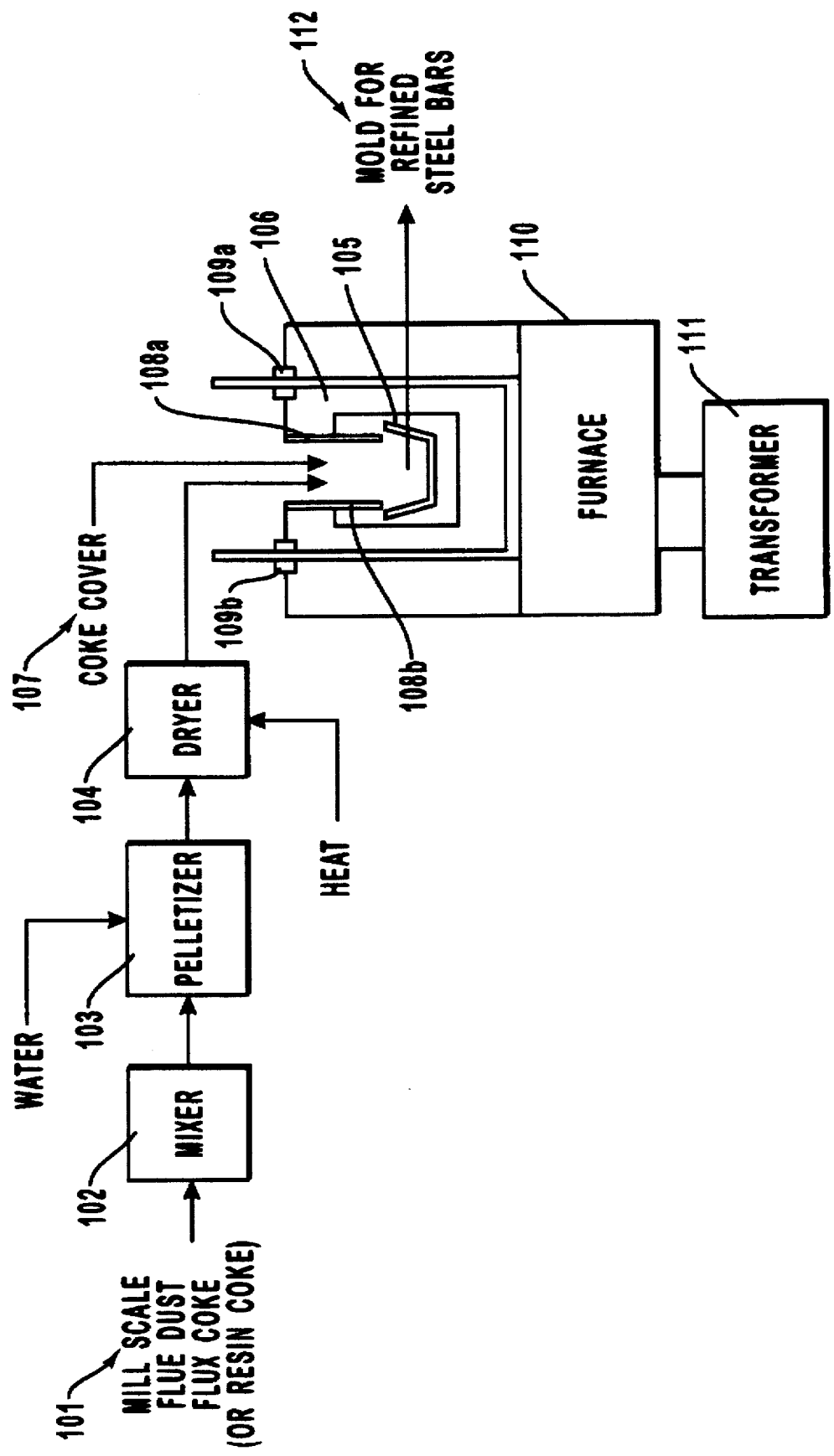
FIG. 1 is a process diagram showing the top level the preferred embodiment of the method of the invention.

FIG. 1 depicts a process flow diagram of the preferred embodiment of the method of the invention. Steel waste products including but not limited to mill scale and flue dust are combined with flux and coke (or alternatively resin coal) 101 in a mixer. Crushed steel slag may also be introduced into the mix as an additive to the flux. The mixer 102 mixes the steel waste products, the flux and the coke 101 together and simultaneously reduces the mixture to a powder or granular form. Mixed product is then transferred to a pelletizer 103. In the pelletizer 103 water is added and the mixture is formed into pellets to aid in the control-ability of the process. The pelletized product is then dried in the dryer 104. Drying of the pelletized mixture is essential to avoid possible explosive reactions in the furnace as residual water is suddenly vaporized. The resulting mixture is introduced to the crucible 105 within the furnace 106. Once the mixture is placed within the crucible 105 a cover of coke 107 is placed over the mixture. This coke cover 107 serves to avoid volitizing the mixture. At this point in the process the two electrodes 108a and b are lowered into the mixture. In the preferred embodiment of the invention the electrodes are composed of a carbon alloy covered conductor and are insulated from the frame 110 of the furnace by insulated electrode guides 109a and b. The electrodes are supplied two phase power from a transformer 111. One electrode is designated positive and the other electrode is designated negative. An arc is struck and maintained between the electrodes and through the charged metal—flux mixture. The metal—flux mixture acts as a conductor with current flowing through it rather than the air between the electrodes because the electrical resistance is much less through the metal—flux mixture than through the air. The flow of current through the metal—flux mixture induces heat, thereby melting the mixture to a molten—liquid state. Furthermore, the electrodes impose an electro-magnetic field on the metal—flux mixture. This imposed electro-magnetic field serves to draw like conductive components of the mixture, specifically steel together.

The preferred mode of operation of the invention requires the electrical power supplied to the electrodes to be single-phase, 90 volts and capable of ramping up from 350 amps to 800 amps.

Once the mixture is fully liquid or molten the electrodes 108a and b are withdrawn and the liquid mixture is poured into molds 112 to solidify into solid steel. At this point the slag floats to the top of the mold and can be broken off once the steel solidifies. This slag can then be recycled through the process of the invention to recover additional steel material from the slag and to make use of the flux materials residual in the slag.

Figure 2:
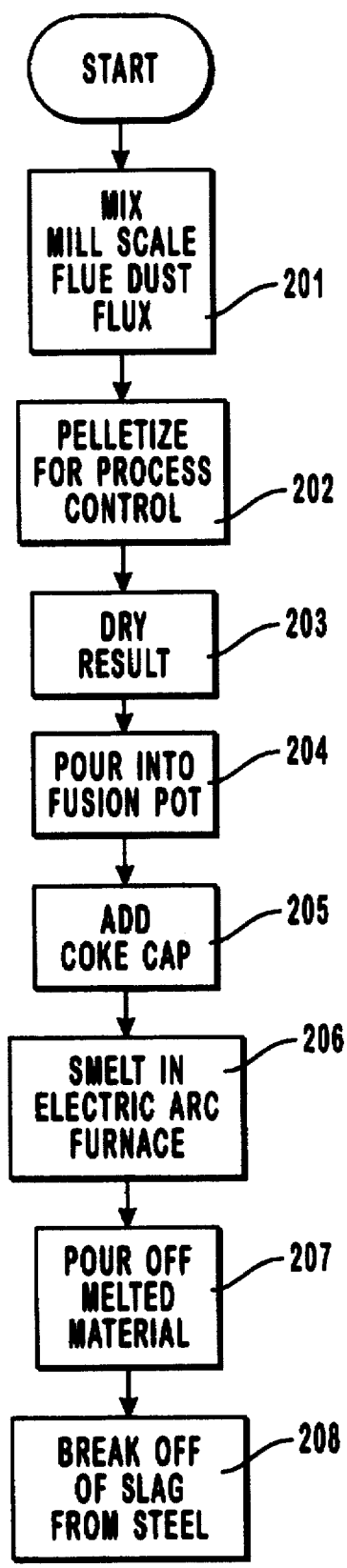
FIG. 2 is a detailed flow diagram of the steps of the preferred embodiment of the invention.

FIG. 2 depicts a detailed flow diagram of the process of the invention. The steel waste, composed primarily of mill scale and flue dust, are mixed 201 with flux. While the precise composition of the flux will vary with the type and quality of the steel waste product being recycled, in the preferred embodiment of the invention the flux will include: silica, approximately 20% by weight; soda ash, approximately 25% by weight; borax, approximately 25% by weight; fluorspar, approximately 5% by weight; and either coke or resin coal, approximately 25% by weight. In the preferred embodiment of the invention, the flux component of the steel waste—flux mixture will compose approximately 50% of the total mixture by weight. The steel waste will be composed of 20% by weight of flue dust and 80% by weight of mill scale. If crushed slag is added as an additive to the flux it can make up upto 25% by weight of the flux.

Once the steel waste—flux mixture is fully mixed and is in a powder or granular form, the material is transferred to a pelletizer, where it is converted to a pelletized form 202. Having the material in a pelletized form enhances the controllability of the process and improves the recovery of metal from the steel waste. Following the pellatization the material is dried 203. Drying is essential to avoid an explosive reaction in the furnace due to rapidly heated—vaporized water. Once the material is pelletized and dried it is transferred to the fusion pot, a refractory lined open top enclosure 204. A coke cap is added 205 to cover the top of the material to keep the melted mixture material from volitizing.

The mixed and pelletized material is then melted in the electric arc furnace 206 as described above. Once the material is fully liquified, the liquid material is poured off 207 into steel molds where once the steel has solidified the slag may be broken off 208.

Figure 3:
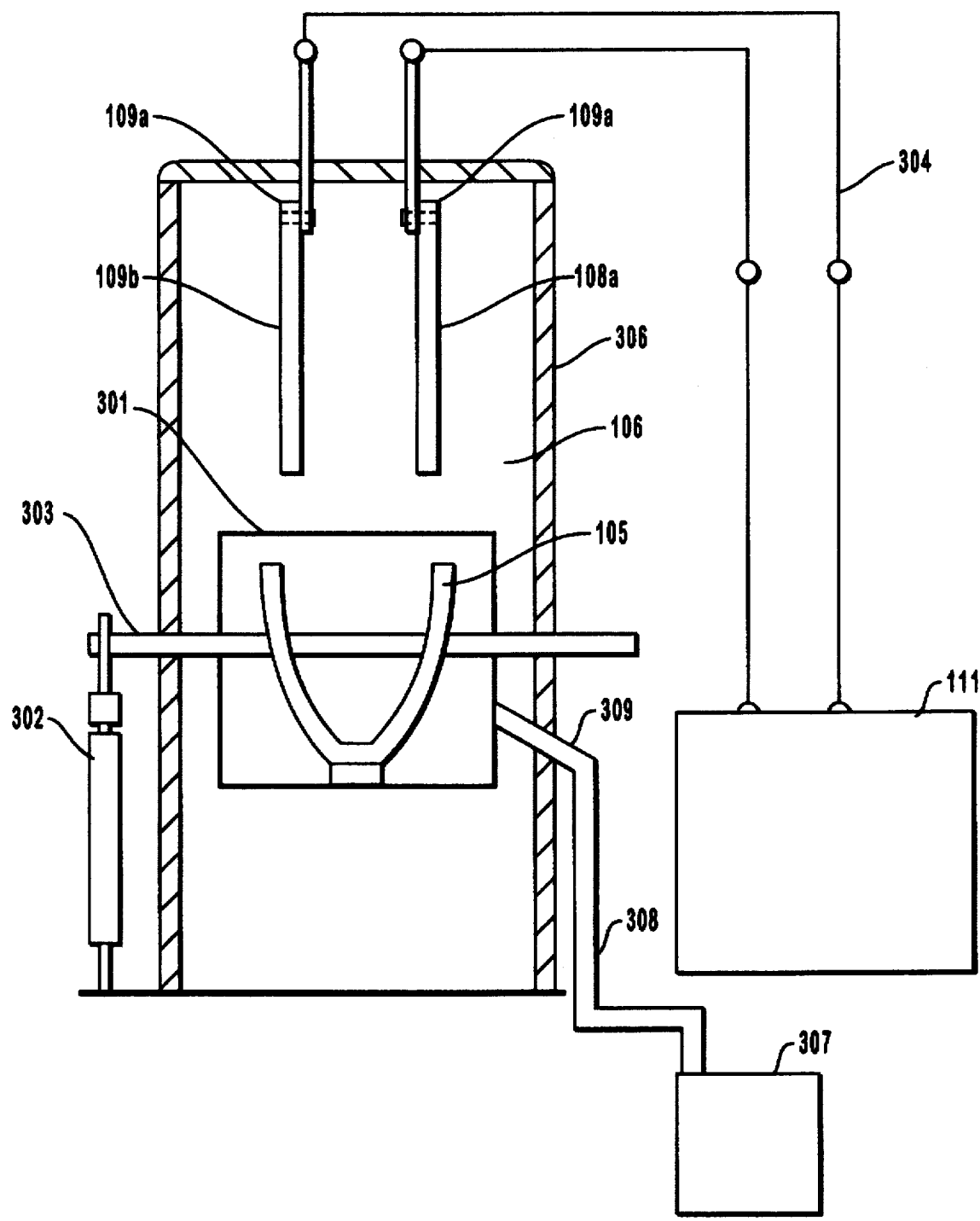
FIG. 3 is a detailed cross-section diagram of the electric arc furnace.

FIG. 3 is a cross-sectional diagram representing the electric arc furnace portion of the invention. In the preferred embodiment of the invention the frame 305 of the furnace 106 can be composed of rigid pipe. The crucible 105 is composed of a very high temperature ceramic such as provided commercially by American Refractories & Crucible Corporation of North Haven, Conn. The refractory lined open-top container (or fusion pot) 301 is composed of a high temperature steel shell lined with a refractory material. Once the mixed material has been fully liquified it is poured into molds through the operation of a hydraulic ram 302 driving a swivel pin 303 which is attached to the refractory lined open-top container 301.

A gas/air pump 307 is provided to force gases into the refractory lined open-top container 301. The pump 307 is connected to a vent 309 in the furnace 106 via an air hose 308.

Power cables 304 are shown providing the electrical connection between the transformer 111 and the electrodes 108a and b.

Figure 4:
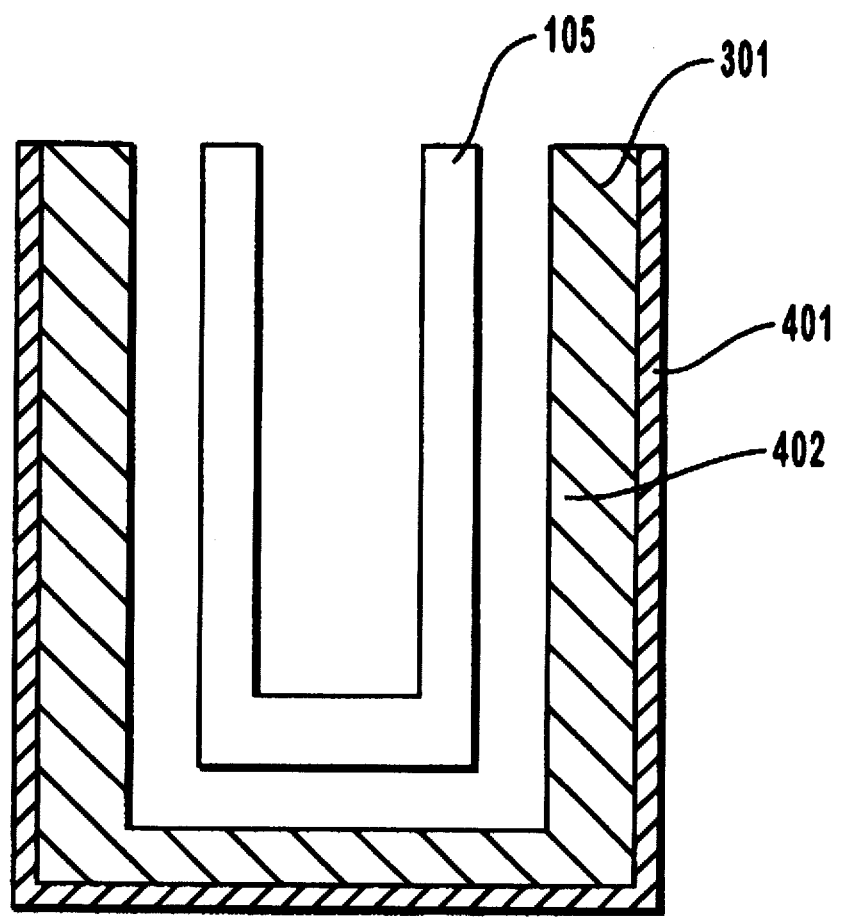
FIG. 4 is a detail drawing of the interior of the electric arc furnace, showing the materials of the crucible.

FIG. 4 shows a detail cross section of the refractory lined open-top container 301. The ceramic crucible 105 is shown in its position within the container 301. The refractory lined open-top container 301 is shown having a steel outside shell 401 and a liner of heat refracting material 402.

In the preferred embodiment of the invention and for rapid production of steel and processing of steel waste, approximately 20% of the liquid material should remain in the crucible after pouring. This material facilitates the rapid melting of newly added pelletized material.

It is to be understood that the above described embodiment of the invention is merely illustrative of numerous and varied other embodiments which may constitute applications of the principles of the invention. Such other embodiments may be readily devised by those skilled in the art without departing from the spirit or scope of this invention and it is our intent that they be deemed within the scope of the invention.

We claim:

1. A method for producing steel bars from steel waste products and a flux composition comprising the steps of:
   (A) mixing the steel waste and the flux composition to produce a mixture, wherein said flux composition includes silica, soda ash, borax, fluorspar, and a coal product;
   (B) pelletizing said mixture to produce a controllable mixture;
   (C) drying said controllable mixture to produce a dry controllable mixture for melting in a furnace;
   (D) melting said dry controllable mixture in a furnace; and
   (E) pouring said melted mixture into a mold.

2. A method for producing steel bars from steel waste products and a flux composition, as recited in claim 1 wherein said mixing the steel waste and the flux composition step further comprises the steps of:
   (1) introducing mill scale to a mixer;
   (2) adding flue dust to said mill scale in said mixer to form a steel waste mix; and
   (3) adding a flux composition to said steel waste mix.

3. A method for producing steel bars from steel waste products and a flux composition, as recited in claim 2 wherein said adding a flux composition to said steel waste mix step further comprises the steps of:
   (a) adding silica to said steel waste mix to form a steel waste and silica mix;
   (b) adding soda ash to said steel waste and silica mix to form a steel waste, silica and soda ash mix;
   (c) adding borax to said steel waste, silica and soda ash mix to form a steel waste, silica, soda ash and borax mix;
   (d) adding fluorspar to said steel waste, silica, soda ash and borax mix to form a steel waste, silica, soda ash, borax and fluorspar mix; and
   (e) adding coke to said steel waste, silica, soda ash, borax and fluorspar mix to form a steel waste and flux mix.

4. A method for producing steel bars from steel waste products and a flux composition as recited in claim 2 wherein said adding a flux composition to said steel waste mix step further comprises the steps of:
   (a) adding silica to said steel waste mix to form a steel waste and silica mix;
   (b) adding soda ash to said steel waste and silica mix to form a steel waste, silica and soda ash mix;
   (c) adding borax to said steel waste, silica and soda ash mix to form a steel waste, silica, soda ash and borax mix;
   (d) adding fluorspar to said steel waste, silica, soda ash and borax mix to form a steel waste, silica, soda ash, borax and fluorspar mix; and
   (e) adding resin coal to said steel waste, silica, soda ash, borax and fluorspar mix to form a steel waste and flux mix.

5. A method for producing steel bars from steel waste products and a flux composition, as recited in claim 2 wherein said adding a flux composition to said steel waste mix step further comprises the steps of:
   (a) adding silica to said steel waste mix to form a steel waste and silica mix;
   (b) adding soda ash to said steel waste and silica mix to form a steel waste, silica and soda ash mix;
   (c) adding borax to said steel waste, silica and soda ash mix to form a steel waste, silica, soda ash and borax mix;
   (d) adding fluorspar to said steel waste, silica, soda ash and borax mix to form a steel waste, silica, soda ash, borax and fluorspar mix;
   (e) adding steel slag to said steel waste, silica, soda ash, borax and fluorspar mix to form a steel waste and flux mix; and
   (f) adding coke to said steel waste, silica, soda ash, borax and fluorspar mix to form a steel waste and flux mix.

6. A method for producing steel bars from steel waste products and a flux composition, as recited in claim 2 wherein said adding a flux composition to said steel waste mix step further comprises the steps of:
   (a) adding silica to said steel waste mix to form a steel waste and silica mix;
   (b) adding soda ash to said steel waste and silica mix to form a steel waste, silica and soda ash mix;
   (c) adding borax to said steel waste, silica and soda ash mix to form a steel waste, silica, soda ash and borax mix;
   (d) adding fluorspar to said steel waste, silica, soda ash and borax mix to form a steel waste, silica, soda ash, borax and fluorspar mix;
   (e) adding steel slag to said steel waste, silica, soda ash, borax and fluorspar mix to form a steel waste and flux mix; and
   (f) adding resin coal to said steel waste, silica, soda ash, borax and fluorspar mix to form a steel waste and flux mix.

7. A method for producing steel bars from steel waste products and a flux composition, as recited in claim 1 wherein said melting said dry controllable mixture in a furnace step further comprises heating said dry controllable mixture in an electric arc furnace.

8. A method for producing steel bars from steel waste products and a flux composition, as recited in claim 1 wherein said melting said dry controllable mixture in a furnace step further comprises adding a coke cover to said dry controllable mixture to avoid volitizing said dry controllable mixture during melting.

* * * * *